(12) United States Patent
Hoshino

(10) Patent No.: US 12,730,984 B2
(45) Date of Patent: Sep. 8, 2026

(54) INFORMATION PROCESSING APPARATUS, INFORMATION PROCESSING METHOD, AND STORAGE MEDIUM

(71) Applicant: NEC Corporation, Tokyo (JP)

(72) Inventor: Ayako Hoshino, Tokyo (JP)

(73) Assignee: NEC CORPORATION, Tokyo (JP)

(*) Notice: Subject to any disclaimer, the term of this patent is extended or adjusted under 35 U.S.C. 154(b) by 256 days.

(21) Appl. No.: 18/567,867

(22) PCT Filed: Jun. 15, 2021

(86) PCT No.: PCT/JP2021/022628
§ 371 (c)(1),
(2) Date: Dec. 7, 2023

(87) PCT Pub. No.: WO2022/264247
PCT Pub. Date: Dec. 22, 2022

(65) Prior Publication Data

US 2024/0273310 A1 Aug. 15, 2024

(51) Int. Cl.
*G06F 40/56* (2020.01)

(52) U.S. Cl.
CPC .................................... *G06F 40/56* (2020.01)

(58) Field of Classification Search
None
See application file for complete search history.

(56) References Cited

U.S. PATENT DOCUMENTS

| | | | | |
|---|---|---|---|---|
| 2015/0019207 | A1* | 1/2015 | Dou | G06F 40/232 704/9 |
| 2017/0147544 | A1* | 5/2017 | Modani | G06F 16/345 |
| 2020/0364303 | A1* | 11/2020 | Liu | G06N 3/08 |

(Continued)

FOREIGN PATENT DOCUMENTS

| | | |
|---|---|---|
| JP | H05-081316 A | 4/1993 |
| JP | 2003-202893 A | 7/2003 |
| JP | 2010-170162 A | 8/2010 |

(Continued)

OTHER PUBLICATIONS

Chen et al. ("Logical Natural Language Generation from Open-Domain Tables", arXiv:2004.10404v2 [cs.CL] Apr. 28, 2020). (Year: 2020).*

(Continued)

*Primary Examiner* — Nicole A K Schmieder

(57) ABSTRACT

An object to generate, from a logical formula representing an inference result, a natural language sentence that is more diverse as compared with a document used to generate an inference rule is attained. In order to attain the object, an information processing apparatus (1) includes: an acquisition section (11) that acquires a logical formula representing an inference result which is based on an inference rule for an observation event; a generation section (12) that generates a natural language sentence from at least one text element with use of a language model generated on the basis of a corpus which does not contain a document used to generate the inference rule, the at least one text element being included in constituents of the logical formula and being text; and an output section (13) that outputs the natural language.

10 Claims, 9 Drawing Sheets

(56) References Cited

U.S. PATENT DOCUMENTS

| | | | | |
|---|---|---|---|---|
| 2021/0124876 | A1* | 4/2021 | Kryscinski | G06F 16/345 |
| 2024/0062084 | A1* | 2/2024 | Kage | G06N 5/041 |

FOREIGN PATENT DOCUMENTS

| | | | |
|---|---|---|---|
| JP | 2018-055620 | A | 4/2018 |
| JP | 2018-055670 | A | 4/2018 |
| JP | 7019875 | B1 | 2/2022 |
| WO | WO2017081715 | A1 | 8/2018 |

OTHER PUBLICATIONS

International Search Report for PCT Application No. PCT/JP2021/022628, mailed on Sep. 21, 2021.

Manome Kana et al., "Sentence Generation from Higher-Order Logical Expressions Using RNN Series Transformation Model", pp. 380-383, "Prioceedings of the Twenty-fourth Annual Meeting of the Association for Natural Language Processing".

Japanese Office Communication for JP Application No. 2023-528788 mailed on Feb. 18, 2025 with English Translation.

* cited by examiner

1
INFORMATION PROCESSING APPARATUS
11
ACQUISITION SECTION
12
GENERATION SECTION
13
OUTPUT SECTION

S1
START
ACQUIRE LOGICAL FORMULA REPRESENTING INFERENCE RESULT
S101
GENERATE NATURAL LANGUAGE SENTENCE
S102
OUTPUT NATURAL LANGUAGE SENTENCE
S103
END

OBSERVATION EVENT
INFERENCE RULE
r1
r2
r3
R
DOCUMENT
d11
d12
d13
D1 (ORIGINAL)
INFERENCE RESULT
2
INFORMATION PROCESSING APPARATUS
21
ACQUISITION SECTION
22
GENERATION SECTION
24
FIRST DETERMINATION SECTION
25
SECOND DETERMINATION SECTION
23
OUTPUT SECTION
26
LANGUAGE MODEL GENERATION SECTION
L
LANGUAGE MODEL
DOCUMENT
d21
d22
d23
D2 (CORPUS)
NATURAL LANGUAGE SENTENCE

S2
START
ACQUIRE CORPUS
S201
EXTRACT N-GRAM
S202
TRAIN LANGUAGE MODEL
S203
END

S3
START
ACQUIRE LOGICAL FORMULA REPRESENTING INFERENCE RESULT
S301
SEPARATE TEXT ELEMENTS INTO GROUPS
S302
FOR EACH GROUP
GENERATE CANDIDATE NATURAL LANGUAGE SENTENCE
S303
EXCLUDE CANDIDATE NATURAL LANGUAGE SENTENCE SIMILAR TO ORIGINAL
S304
EXCLUDE CANDIDATE NATURAL LANGUAGE SENTENCE INCONSISTENT WITH ORIGINAL
S305
OUTPUT NATURAL LANGUAGE SENTENCE
S306
END

START
S302
S401
EXTRACT TEXT ELEMENTS
BODY PART (e1, "CLAUSTRUM")
^ SYMPTOM (e1, "BLEEDING")
^ SYMPTOM (e2, "LANGUAGE DISORDER")
S402
SEPARATE TEXT ELEMENTS INTO GROUPS ON BASIS OF ATTRIBUTE
["CLAUSTRUM", "BLEEDING"], ["LANGUAGE DISORDER"]
END

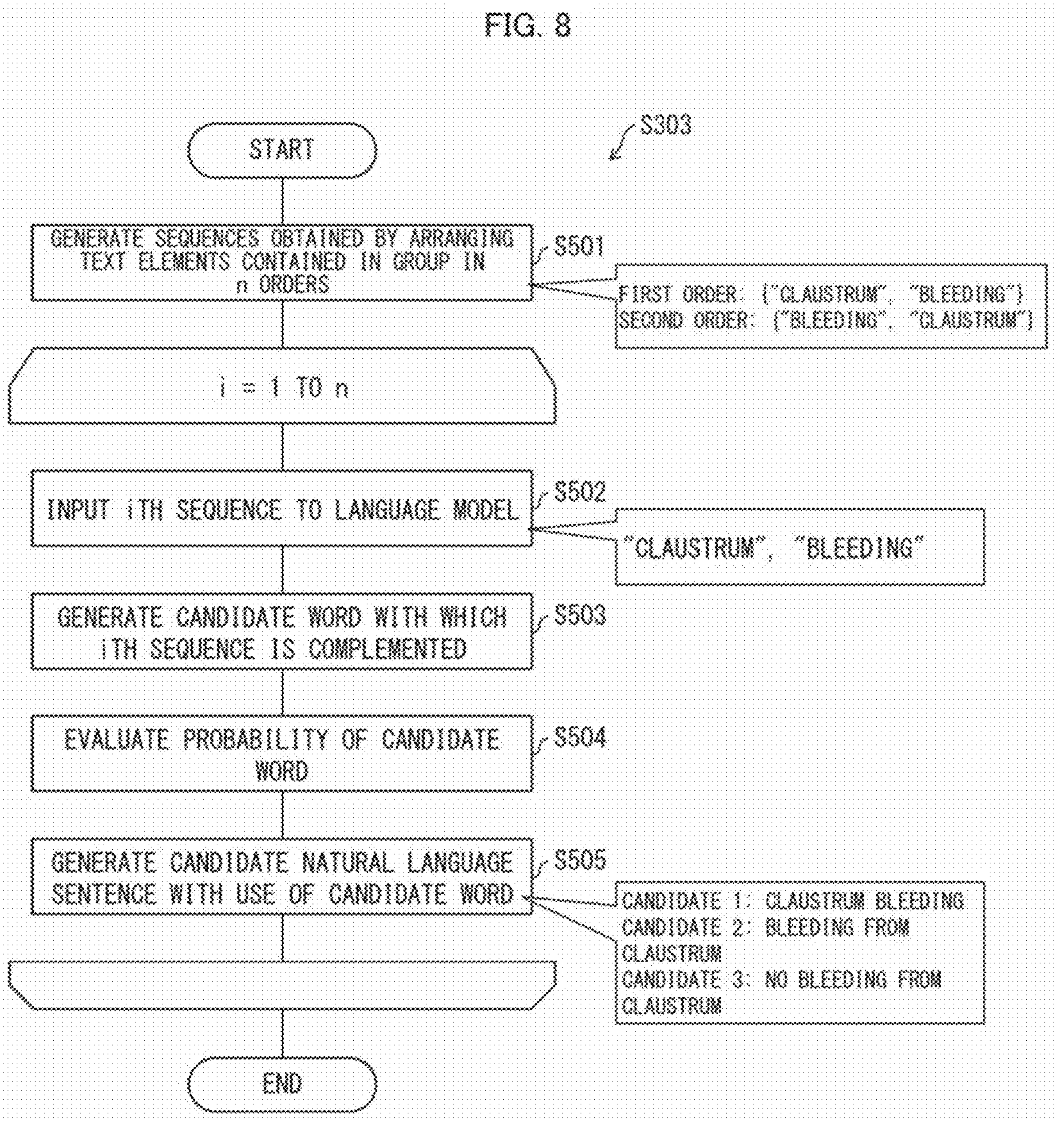
FIG. 8
S303
START
GENERATE SEQUENCES OBTAINED BY ARRANGING TEXT ELEMENTS CONTAINED IN GROUP IN n ORDERS
S501
FIRST ORDER: {"CLAUSTRUM", "BLEEDING"}
SECOND ORDER: {"BLEEDING", "CLAUSTRUM"}
i = 1 TO n
INPUT iTH SEQUENCE TO LANGUAGE MODEL
S502
"CLAUSTRUM", "BLEEDING"
GENERATE CANDIDATE WORD WITH WHICH iTH SEQUENCE IS COMPLEMENTED
S503
EVALUATE PROBABILITY OF CANDIDATE WORD
S504
GENERATE CANDIDATE NATURAL LANGUAGE SENTENCE WITH USE OF CANDIDATE WORD
S505
CANDIDATE 1: CLAUSTRUM BLEEDING
CANDIDATE 2: BLEEDING FROM CLAUSTRUM
CANDIDATE 3: NO BLEEDING FROM CLAUSTRUM
END

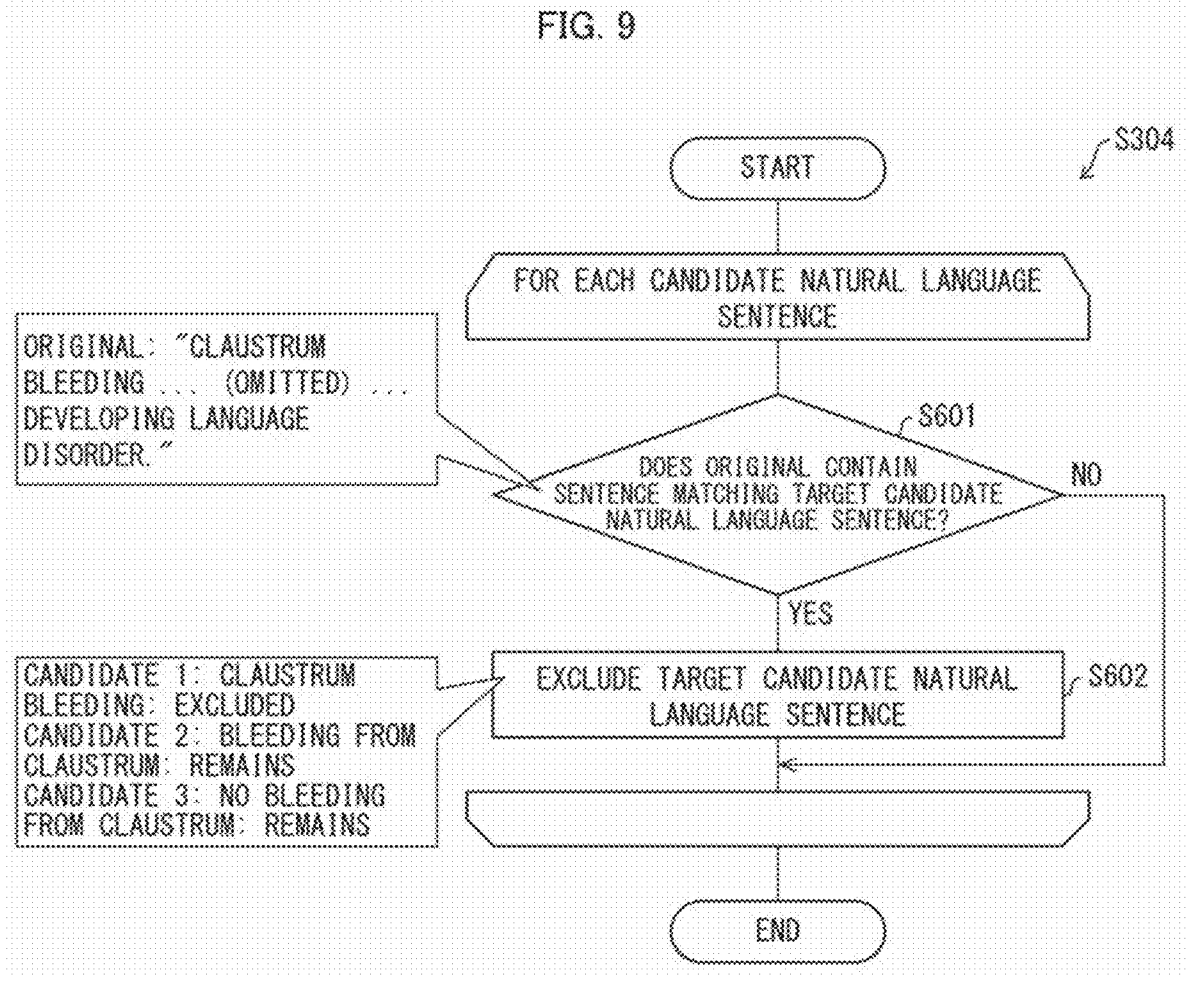
FIG. 9
S304
START
FOR EACH CANDIDATE NATURAL LANGUAGE SENTENCE
ORIGINAL: "CLAUSTRUM BLEEDING ... (OMITTED) ... DEVELOPING LANGUAGE DISORDER."
S601
DOES ORIGINAL CONTAIN SENTENCE MATCHING TARGET CANDIDATE NATURAL LANGUAGE SENTENCE?
NO
YES
CANDIDATE 1: CLAUSTRUM BLEEDING: EXCLUDED
CANDIDATE 2: BLEEDING FROM CLAUSTRUM: REMAINS
CANDIDATE 3: NO BLEEDING FROM CLAUSTRUM: REMAINS
EXCLUDE TARGET CANDIDATE NATURAL LANGUAGE SENTENCE
S602
END

INFORMATION PROCESSING APPARATUS, INFORMATION PROCESSING METHOD, AND STORAGE MEDIUM

This application is a National Stage Entry of PCT/JP2021/022628 filed on Jun. 15, 2021, the contents of all of which are incorporated herein by reference, in their entirety.

TECHNICAL FIELD

The present invention relates to a technique for generating a natural language sentence from a logical formula representing an inference result that is based on an inference rule.

BACKGROUND ART

A technique for generating a natural language sentence from a logical formula representing an inference result that is based on an inference rule is known. A logical formula representing an inference result contains not only information indicative of a hypothesis derived by inference but also information indicative of an applied rule. This makes it easy to understand how the hypothesis has been derived, but it is difficult to intuitively understand the inference result because the inference result is represented by the logical formula. Thus, in some cases, a natural language sentence is generated from a logical formula representing an inference result, and the generated natural language sentence is output.

Examples of a related technique that is applicable to such a case include techniques disclosed in Patent Literatures 1 and 2. Patent Literature 1 discloses a technique in which the meaning of a natural language sentence that has been input is extracted in the form of a logical formula, and an extraction result is changed to the natural language sentence again and displayed. According to such a technique, natural language expression data associated with a predicate is referred to so that a natural language sentence is generated from an extraction result.

Patent Literature 2 discloses a technique in which a synonymous conditional sentence or conditional sentence corresponding to a text input sentence is used to convert the text input sentence into an output sentence that is based on a sentence at a symbolic logical formula level, and a text sentence obtained by inversely converting the output sentence is output. According to such a technique, a synonymous conditional sentence or conditional sentence used to convert a text input sentence into an output sentence is used to inversely convert the output sentence.

CITATION LIST

Patent Literature

Patent Literature 1

Japanese Patent Application Publication Tokukaihei No. 5-81316

Patent Literature 2

Japanese Patent Application Publication Tokukaihei No. 2010-170162

SUMMARY OF INVENTION

Technical Problem

Note here that there is a case where in order to generate a natural language sentence from a logical formula representing an inference result, it is desirable to generate a natural language sentence that is more diverse as compared with a document used to generate an inference rule. Specific examples of such a case include a case where consideration is given to leakage of sensitive information contained in the document. Other specific examples of such a case include a case where a natural language sentence that is simpler as compared with the document is desired to be generated.

However, according to the technique disclosed in Patent Literature 1, even with reference to natural language expression data associated with a predicate, it is not necessarily possible to generate a natural language sentence that is diverse as compared with an original input natural language sentence. Furthermore, according to the technique disclosed in Patent Literature 2, even by carrying out inverse conversion with use of a synonymous conditional sentence or conditional sentence used to carry out conversion, it is not necessarily possible to output a text sentence that is diverse with respect to an original text input sentence. Thus, in a case where the techniques disclosed in Patent Literatures 1 and 2 are used for a process for generating a natural language sentence from a logical formula representing an inference result, there is room for improvement in order to generate a natural language sentence that is more diverse as compared with a document used to generate an inference rule.

An example aspect of the present invention has been made in view of the above problems, and an example object thereof is to provide a technique for generating, from a logical formula representing an inference result, a natural language sentence that is more diverse as compared with a document used to generate an inference rule.

Solution to Problem

An information processing apparatus according to an example aspect of the present invention includes at least one processor, the at least one processor carrying out: an acquisition process for acquiring a logical formula representing an inference result which is based on an inference rule for an observation event; a generation process for generating a natural language sentence from at least one text element with use of a language model generated on the basis of a corpus which does not contain a document used to generate the inference rule, the at least one text element being included in constituents of the logical formula and being text; and an output process for outputting the natural language sentence.

An information processing method according to an example aspect of the present invention includes: an acquisition process in which at least one processor acquires a logical formula representing an inference result which is based on an inference rule for an observation event; a generation process in which the at least one processor generates a natural language sentence from at least one text element with use of a language model generated on the basis of a corpus which does not contain a document used to generate the inference rule, the at least one text element being included in constituents of the logical formula and being text; and an output process in which the at least one processor outputting outputs the natural language sentence.

A non-transitory storage medium storing therein a program according to an example aspect of the present invention is a program for causing a computer to function as an information processing apparatus, the program causing the computer to carry out: an acquisition process for acquiring a logical formula representing an inference result which is based on an inference rule for an observation event; a generation process for generating a natural language sentence from at least one text element with use of a language model generated on the basis of a corpus which does not contain a document used to generate the inference rule, the at least one text element being included in constituents of the logical formula and being text; and an output process for outputting the natural language sentence.

Advantageous Effects of Invention

An example aspect of the present invention makes it possible to generate, from a logical formula representing an inference result, a natural language sentence that is more diverse as compared with a document used to generate an inference rule.

BRIEF DESCRIPTION OF DRAWINGS

FIG. 8 is a flowchart showing a specific flow of a process in the second example embodiment of the present invention for generating candidate natural language sentences.

FIG. 9 is a flowchart showing a specific flow of a process in the second example embodiment of the present invention for excluding a candidate natural language sentence that is similar to an original.

EXAMPLE EMBODIMENTS

First Example Embodiment

The following description will discuss a first example embodiment of the present invention in detail with reference to the drawings. The present example embodiment is an embodiment serving as a basis for an example embodiment described later.

<Configuration of Information Processing Apparatus>

Figure 1:
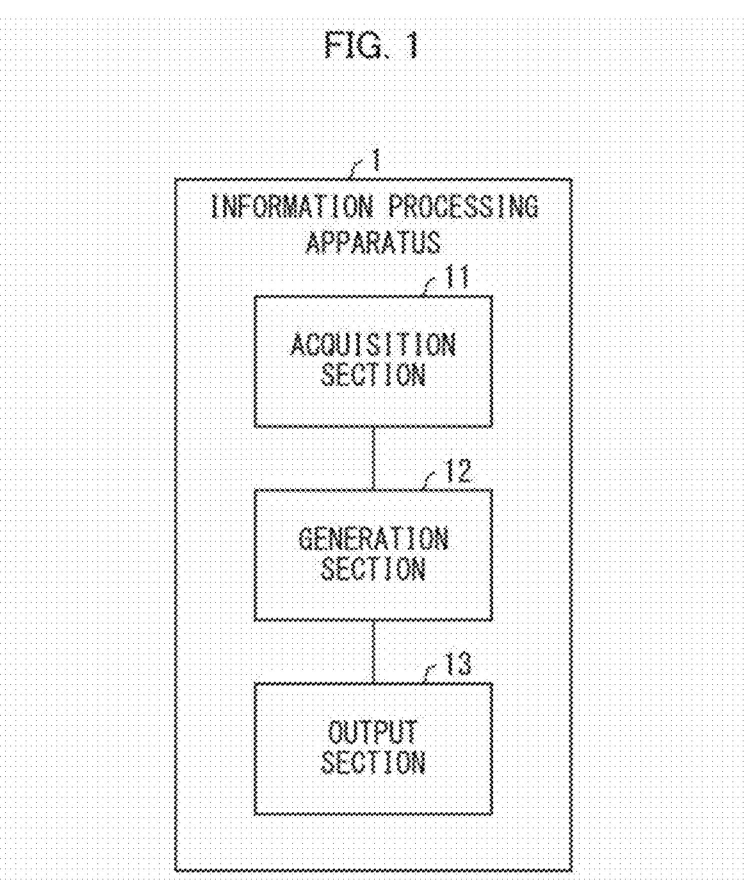
FIG. 1 is a block diagram illustrating a configuration of an information processing apparatus according to a first example embodiment of the present invention.

The following description will discuss a configuration of an information processing apparatus 1 according to the present example embodiment with reference to FIG. 1. FIG. 1 is a block diagram illustrating the configuration of the information processing apparatus 1. The information processing apparatus 1 includes an acquisition section 11, a generation section 12, and an output section 13 as illustrated in FIG. 1.

The acquisition section 11 acquires a logical formula representing an inference result that is based on an inference rule for an observation event. The generation section 12 generates a natural language sentence from a text element with use of a language model generated on the basis of a corpus that does not contain a document used to generate the inference rule, the text element being included in constituents of the logical formula and being text. The output section 13 outputs the natural language sentence. The acquisition section 11 is an example configuration that achieves an acquisition means recited in the claims. The generation section 12 is an example configuration that achieves a generation means recited in the claims. The output section 13 is an example configuration that achieves an output means recited in the claims.

(Inference Rule)

An inference rule is generated from a document containing background knowledge. The document contains, for example, contents related to a field to be subjected to inference. The inference rule also includes at least one rule. An inference result that is based on the inference rule is generated by an inference engine. The inference engine uses an observation event as an input, generates a hypothesis by carrying out inference with use of at least one rule that is among inference rules and that is applicable to the observation event which has been input to the inference engine, and outputs a logical formula representing an inference result. The logical formula representing the inference result is, for example, a first-order predicate logical formula, but is not limited to this. The logical formula representing the inference result contains information indicative of the hypothesis and information indicative of a rule used to derive the hypothesis. The inference rule and the inference engine may be stored in a memory of the information processing apparatus 1 or may be stored in another apparatus capable of communicating with the information processing apparatus 1.

(Language Model)

A language model is a model that outputs a degree of confidence as the natural language sentence in a word string input thereto. Use of such a language model makes it also possible to predict a word with which the word string that has been input to the language model is complemented. The word with which the word string is complemented is a word that can allow the word string obtained by complementing the word string with the word to be the natural language sentence. Such a language model is generated with use of a corpus. The corpus does not contain the above-described document used to generate the inference rule. In other words, all documents used to generate the language model and contained in the corpus are documents that are not used to generate the inference rule. Note that an algorithm for use in generation of the language model is desirably an algorithm that does not require training data. For example, a model that can be generated by such an algorithm is exemplified by, but not limited to, an n-gram language model, a hidden Markov model (HMM), conditional random fields (CRFs), and a long short-term memory (LSTM). The language model may be stored in the memory of the information processing apparatus 1 or may be stored in another apparatus capable of communicating with the information processing apparatus 1.

<Flow of Information Processing Method>

Figure 2:
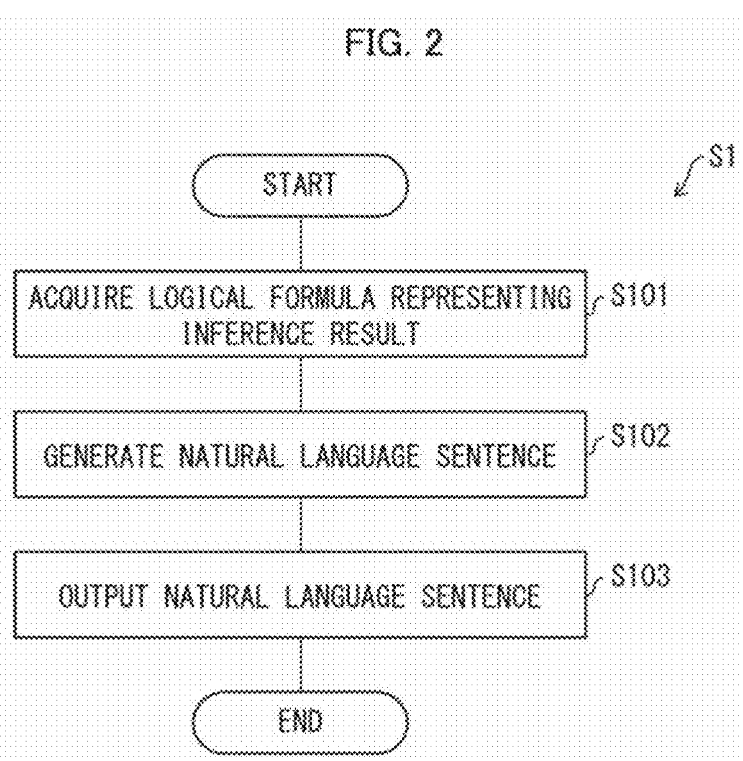
FIG. 2 is a flowchart showing a flow of an information processing method according to the first example embodiment of the present invention.

The following description will discuss, with reference to FIG. 2, a flow of an information processing method S1 that is carried out by the information processing apparatus 1 configured as described above. FIG. 2 is a flowchart showing the flow of the information processing method S1. The information processing method S1 includes steps S101 to S103 as illustrated in FIG. 2.

(Step S101: Acquiring)

In the step S101, the acquisition section 11 acquires a logical formula representing an inference result that is based on an inference rule for an observation event. Specifically, the acquisition section 11 inputs an observation event to an inference engine and acquires a logical formula output from the inference engine. For example, the acquisition section 11 may acquire such a logical formula from another apparatus capable of communicating with the information processing apparatus 1 or may acquire a logical formula stored in the memory of the information processing apparatus 1.

(Step S102: Generating)

In the step S102, the generation section 12 generates a natural language sentence from a text element with use of the above-described language model, the text element being included in constituents of the logical formula and being text. For example, by inputting, to the language model, a plurality of text elements included in the constituents of the logical formula, the generation section 12 generates a word with which a string of the plurality of text elements is complemented. The generation section 12 complements the string of the plurality of text elements with the generated word so as to generate the natural language sentence.

(Step S103: Outputting)

In the step S103, the output section 13 outputs the generated natural language sentence. For example, the output section 13 may output the natural language sentence to an output apparatus such as a display or a loudspeaker that is connected to the information processing apparatus 1. In a case where the natural language sentence is output to the loudspeaker, the output section 13 generates audio data from the generated natural language sentence and outputs the audio data. Alternatively, the output section 13 may write the generated natural language sentence to a memory of the information processing apparatus 1 so as to output the natural language sentence. Alternatively, the output section 13 may output the natural language sentence by transmitting the natural language sentence to another apparatus communicatively connected with the information processing apparatus 1.

Effect of the Present Example Embodiment

As described above, a configuration is employed such that in the information processing apparatus 1 according to the present example embodiment and the information processing method S1 according to the present example embodiment, a logical formula representing an inference result which is based on an inference rule for an observation event is acquired; a natural language sentence is generated from a text element with use of a language model generated on the basis of a corpus which does not contain a document used to generate the inference rule, the text element being included in constituents of the logical formula and being text; and the natural language is output.

As described above, the language model used in the present example embodiment is generated on the basis of a corpus which does not contain a document used to generate the inference rule. This causes a natural language sentence that is generated with use of such a language model to contain an expression contained in such a corpus. This makes it possible to expect the natural language sentence to contain an expression that is different from a sentence contained in the document used to generate the inference rule. This brings about an effect of generating, from a logical formula representing an inference result, a natural language sentence that is more diverse as compared with a document used to generate an inference rule.

Second Example Embodiment

<Configuration of Information Processing Apparatus>

Figure 3:
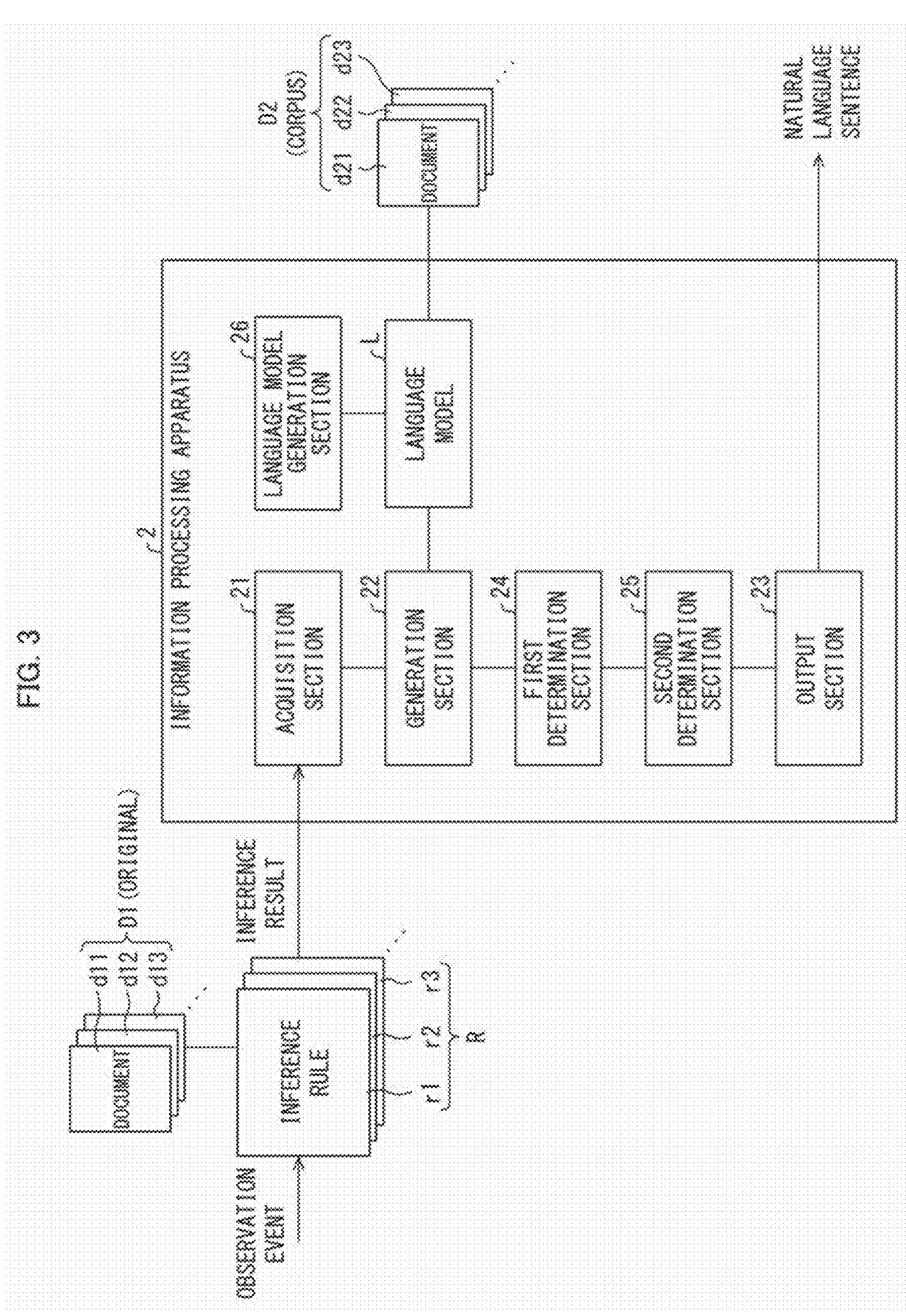
FIG. 3 is a block diagram illustrating a configuration of an information processing apparatus according to a second example embodiment of the present invention.

The following description will discuss a configuration of an information processing apparatus 2 according to the present example embodiment with reference to FIG. 3. FIG. 3 is a block diagram illustrating the configuration of the information processing apparatus 2. The information processing apparatus 2 includes an acquisition section 21, a generation section 22, an output section 23, a first determination section 24, a second determination section 25, a language model generation section 26, and a language model L as illustrated in FIG. 3.

The following description will discuss a second example embodiment of the present invention in detail with reference to the drawings. Note that members having functions identical to those of the respective members described in the first example embodiment are given respective identical reference numerals, and a description of those members is omitted as appropriate.

The acquisition section 21 acquires a logical formula representing an inference result that is based on an inference rule R for an observation event. The inference rule R includes rules r1, r2, r3, . . . . Details of the inference rule R are similar to the details of the inference rule described in the first example embodiment. In the present example embodiment, a document used to generate the inference rule R is referred to as an original D1. The original D1 includes documents d11, d12, d13, . . . concerning a specific field. A case where the original D1 includes a plurality of documents is described here. Note, however, that the original D1 may alternatively include a single document. The specific field is exemplified by, but not limited to, the medical field and the field of cybersecurity.

The generation section 22 generates a natural language sentence from a text element with use of the language model L, the text element being included in constituents of the logical formula and being text. The language model L has been generated with use of a corpus D2 which does not contain the original D1 and whose field is identical to a field of the original D1. In other words, the corpus D2 contains documents d21, d22, d23, . . . concerning a specific field that is identical to a field of the documents included in the original D1. Note that the original D1 does not include any of the documents d21, d22, d32, . . . . A process for generating the natural language sentence will be described later in detail.

The language model generation section 26 uses the corpus D2 to generate the language model L. For example, the language model generation section 26 may extract an n-gram from the corpus D2 and generate an n-gram language model. A process for generating the language model L will be described later in detail.

The first determination section 24 determines, with reference to a result of comparison between the original D1 and the natural language sentence generated by the generation section 22, whether the natural language sentence is similar to the original D1. For example, the natural language sentence which is similar to the original D1 may mean that the original D1 contains a sentence which matches the natural language sentence. The original D1 that is referred to in order to determine whether the natural language sentence is similar to the original D1 may be all or some of the original D1. Such a determination process will be described later in detail.

The second determination section 25 determines, with reference to the result of comparison between the original D1 and the natural language sentence generated by the generation section 22, whether the natural language sentence is consistent with contents of the original D1. For example, the natural language sentence that is consistent with the contents of the original D1 may mean that the natural language sentence is not opposite in content from the original D1. Such a determination process will be described later in detail.

In a case where the first determination section 24 determines that the natural language sentence generated by the generation section 22 is dissimilar to the original D1, the output section 23 outputs the natural language sentence. In a case where the second determination section 25 determines that the natural language sentence generated by the generation section 22 is consistent with the contents of the document D1, the output section 23 outputs the natural language sentence. In the present example embodiment, in a case where the first determination section 24 determines that the natural language sentence generated by the generation section 22 is dissimilar to the original D1, and the second determination section 25 determines that the natural language sentence generated by the generation section 22 is consistent with the contents of the document D1, the output section 23 outputs the natural language sentence. Note, however, that the present example embodiment is not limited to this. In a case where the first determination section 24 determines that the natural language sentence generated by the generation section 22 is dissimilar to the original D1, or the second determination section 25 determines that the natural language sentence generated by the generation section 22 is consistent with the contents of the document D1, the output section 23 may output the natural language sentence.

<Flow of Information Processing Method: Generation of Language Model>

Figure 4:
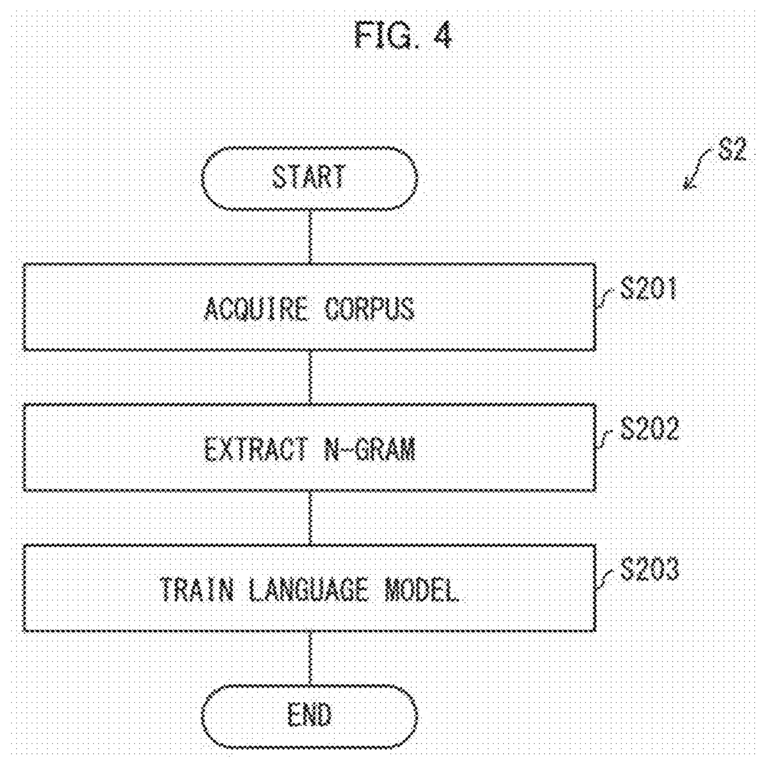
FIG. 4 is a flowchart showing a flow of an information processing method according to the second example embodiment of the present invention.

First, the following description will discuss, with reference to FIG. 4, a flow of an information processing method S2 by which the information processing apparatus 2 generates the language model L. An example in which the language model L is an n-gram language model is described here. Note, however, that the example does not limit a type of a model constituting the language model L. FIG. 4 is a flowchart showing the flow of the information processing method S2 by which the language model L is generated. The information processing method S2 includes steps S201 to S203 as illustrated in FIG. 4.

(Step S201)

In the step S201, the language model generation section 26 acquires the corpus D2.

(Step S202)

In the step S202, the language model generation section 26 extracts an n-gram from the documents d21, d22, d23, . . . contained in the corpus D2. A unit of the n-gram to be extracted is exemplified by, but not limited to, a word unit. Furthermore, N has a value that is exemplified by, but not limited to, 3.

(Step S203)

In the step S203, the language model generation section 26 uses the extracted n-gram to train the language model L. For example, the language model generation section 26 calculates a continuous occurrence probability with which words contained in the extracted n-gram occur continuously, and generates the language model L on the basis of a statistical result for the continuous occurrence probability. The language model generation section 26 may apply various known methods for improving accuracy of the n-gram language model. The language model generation section 26 stores the generated language model L in a memory of the information processing apparatus 2.

<Flow of Information Processing Method: Generation of Natural Language Sentence>

Figure 5:
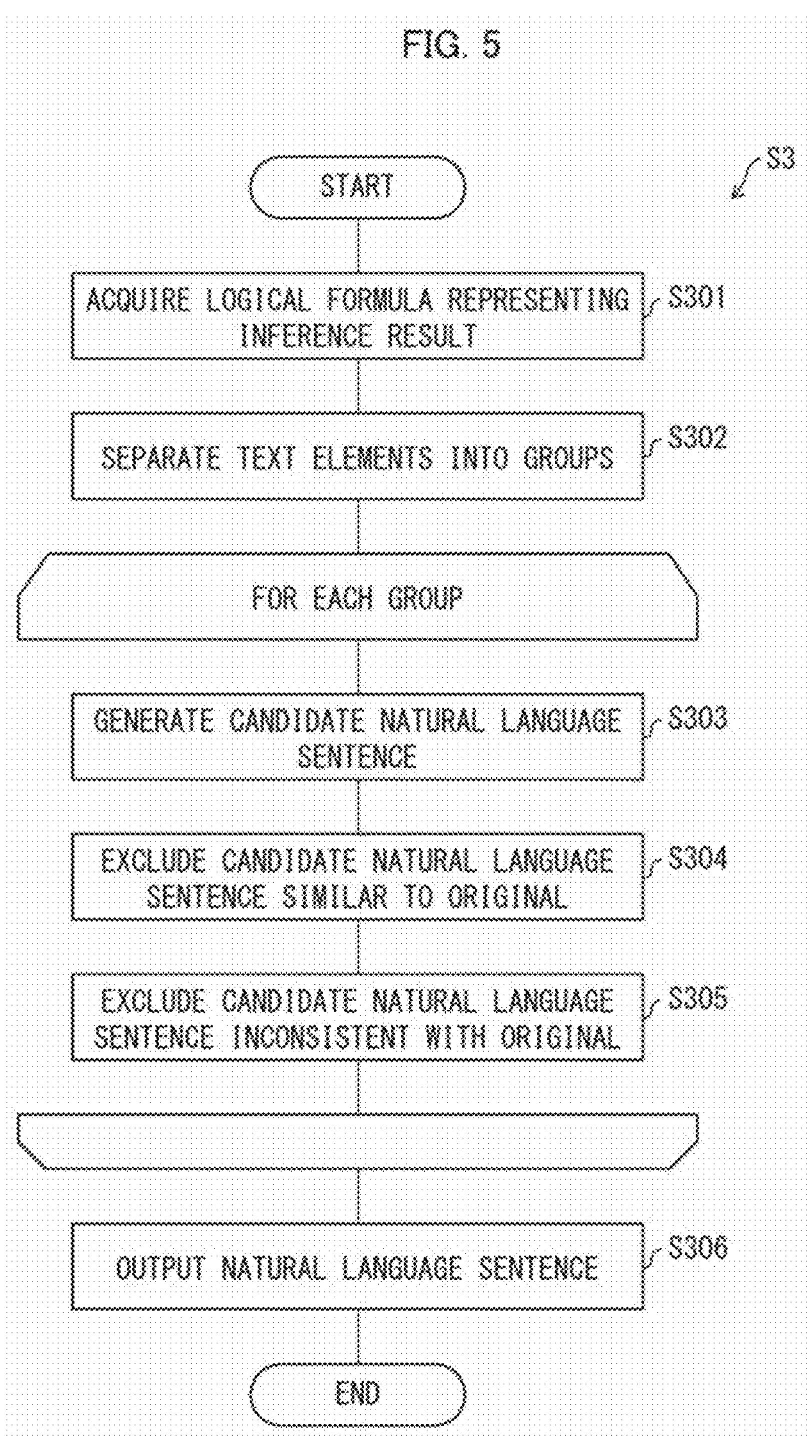
FIG. 5 is a flowchart showing a flow of another information processing method according to the second example embodiment of the present invention.

Next, the following description will discuss, with reference to FIG. 5, a flow of an information processing method S3 by which the information processing apparatus 2 generates the natural language sentence. FIG. 5 is a flowchart showing the flow of the information processing method S3 by which the natural language sentence is generated. The information processing method S3 includes steps S301 to S306 as illustrated in FIG. 5.

(Step S301)

In the step S301, the acquisition section 21 acquires a logical formula representing an inference result. Specifically, the acquisition section 21 inputs an observation event to an inference engine and acquires a logical formula output from the inference engine. For example, the acquisition section 21 may acquire such a logical formula from another apparatus capable of communicating with the information processing apparatus 2 or may acquire a logical formula stored in the memory of the information processing apparatus 2.

Specific Example of Logical Formula

Figure 6:
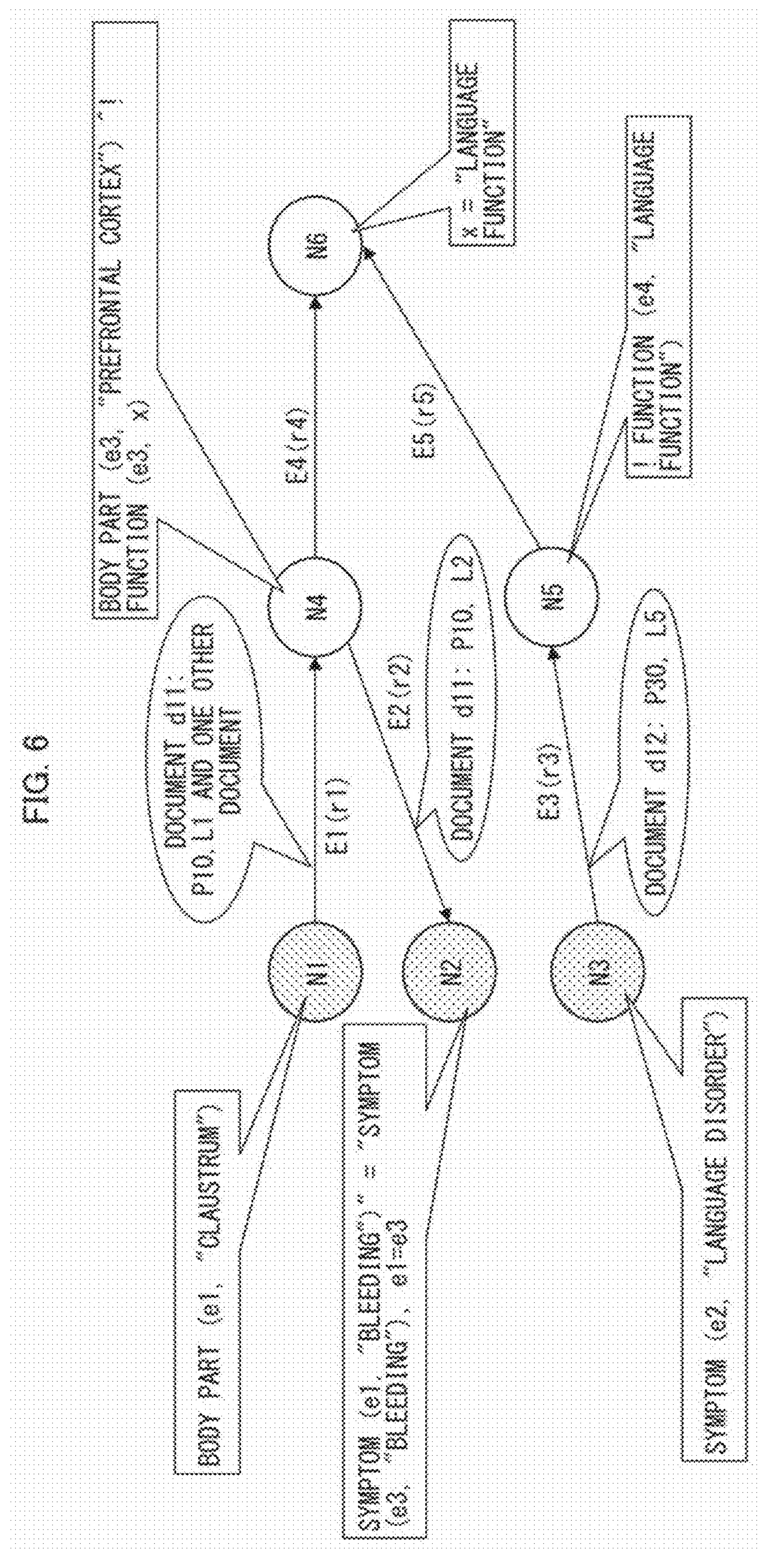
FIG. 6 is a diagram illustrating a specific example of a logical formula in the second example embodiment of the present invention, the logical formula representing an inference result.

The following description will discuss, with reference to FIG. 6, a specific example of the logical formula representing the inference result. FIG. 6 is a diagram illustrating the specific example of the logical formula representing the inference result.

As illustrated in FIG. 6, here, the logical formula representing the inference result is expressed by a graph structure and has nodes N1 to N6 and edges E1 to E5. The nodes N1 to N3 indicate observation events input to the inference engine. The edges E1 to E5 indicate rules applied to the observation events indicated by the nodes N1 to N3. Assume here that the edges E1 to E5 indicate rules r1 to r5. The nodes N4 to N6 indicate hypotheses inferred by applying the rules r1 to r5 to the observation events indicated by the nodes N1 to N3. In other words, in this example, the logical formula representing the inference result contains information (the nodes N1 to N3) indicating the observation events input to the inference engine, information (the nodes N4 to N6) indicating the hypotheses derived by inference, and information (the edges E1 to E5) indicating the rules used to derive the hypotheses.

In this example, the node N1 is an observation event represented by a logical formula "body part (e1, "claustrum")", and indicates that a target to be observed is a body part "claustrum" in an event "e1". Note here that the event is an attribute of the observation event, indicates, for example, an observation place, an observer, a timing of an observation, or a document describing the observation event, and is given in advance to the observation event. The node N2 is an observation event represented by a logical formula "symptom (e1, "bleeding")"="symptom (e3, "bleeding"), e1=e3", and indicates that a symptom of bleeding was observed in the event "e1" and an event "e3" and that the event "e1" is equal to the event "e3". The node N3 is an observation event represented by a logical formula "symptom (e2, "language disorder")", and indicates that a symptom of language disorder was observed in an event "e2".

Furthermore, in this example, the node N4 indicates a hypothesis generated by applying, to the observation events indicated by the nodes N1 and N2, the rules r1 and r2 indicated by the edges E1 and E2. The node N4 is represented by a logical formula "body part (e3, "prefrontal cortex") ˆ! function (e3, x)", and indicates a hypothesis that in the event "e3", a body part "prefrontal cortex" does not have a function represented by a variable x. The node N5 indicates a hypothesis generated by applying, to the observation event indicated by the node N3, the rule r3 indicated by the edge E3. The node N5 is represented by a logical formula "! function (e4, "language function")", and indicates a hypothesis that the target to be observed does not have a language function in an event "e4". The node N6 indicates a hypothesis generated by applying, to the hypotheses indicated by the nodes N4 and N5, the rules r4 and r5 indicated by the edges E4 and E5. The node N6 is represented by a logical formula "x="language function"", and indicates a hypothesis that the variable "x" in the hypothesis indicated by the node N4 is the "language function".

Furthermore, in this example, a part "document d11: p10, L1" of the original D1, the part serving as ground for the rule r1, is associated with the rule r1 indicated by the edge E1. In other words, the rule r1 is generated with reference to contents described in the part. In the following description, a part of the original D1, the part serving as ground for each of the rules, is also referred to as ground information. Ground information "document d11: P10, L2" is associated with the rule r2. Ground information "document d12: P30, L5" is associated with the rule r3.

As described above, the logical formula represented by the graph structure illustrated in FIG. 4 indicates an inference result that "a hypothesis that the prefrontal cortex does not have the language function is inferred in a case where the symptoms of bleeding from the claustrum and language disorder are observed". Note, however, that it is difficult to intuitively understand the inference result. In the present example embodiment, a natural language sentence that is more diverse as compared with the original D1 is generated and output from such a logical formula by carrying out the subsequent steps S302 to S306.

(Step S302)

In the step S302, the generation section 22 separates, into a plurality of groups, a plurality of text elements contained in the logical formula representing the inference result. Assume here that the logical formula representing the inference result contains the plurality of text elements. This step will be described later in detail. Thereafter, the information processing apparatus 2 carries out the steps S303 to S305 with respect to each of the groups into which the plurality of text elements have been separated. In a case where the logical formula representing the inference result contains one text element, it is only necessary to carry out the steps S303 to S305 assuming that there is one group containing the one text element.

(Step S303)

In the step S303, the generation section 22 uses the language model L to generate a candidate natural language sentence from at least one text element contained in the group. Note that the number of candidate natural language sentences generated for each of the groups may be one or more. Note also that there may be a group in which the number of candidate natural language sentences is 0 (zero). This step will be described later in detail.

(Step S304)

In the step S304, the generation section 22 uses the first determination section 24 to exclude a candidate natural language sentence that is among the candidate natural language sentences generated in the step S303 and that is similar to the original D1. The remaining candidate natural language sentences are dissimilar to the original D1. This step will be described later in detail.

(Step S305)

In the step S304, the generation section 22 uses the second determination section 25 to exclude a candidate natural language sentence that is among the candidate natural language sentences which remain after the process in the step S304 and which are dissimilar to the original D1 and that is inconsistent with the contents of the original D1. The remaining candidate natural language sentences are dissimilar to the original D1 and are consistent in content with original D1. This step will be described later in detail.

The information processing apparatus 2 that has carried out the process in the steps S303 to S305 with respect to each of the groups carries out the following step S306.

(Step S306)

In the step S306, the output section 23 outputs, as the natural language sentence, a candidate natural language sentence remaining after the process in the steps S304 and S305 for each of the groups. Thus, a candidate natural language sentence that is dissimilar to the original D1 and that is consistent in content with the original D1 is output from the logical formula representing the inference result. A specific example of an output destination is as described in the first example embodiment.

(Details of Process for Separation into Groups)

Figure 7:
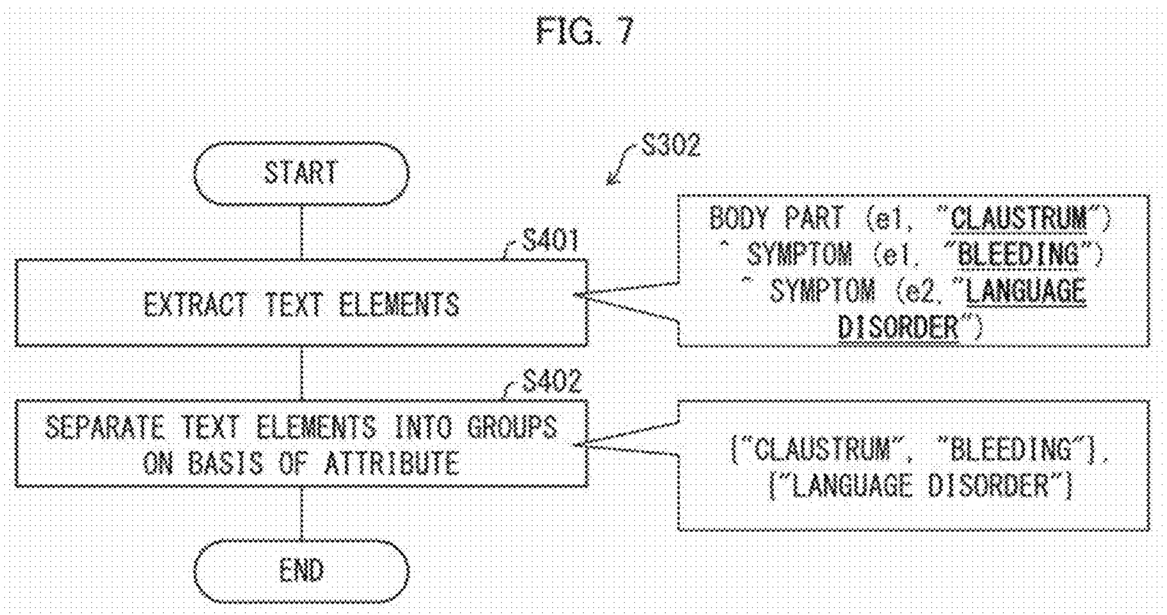
FIG. 7 is a flowchart showing a specific flow of a process in the second example embodiment of the present invention for separation into a plurality of groups.

The following description will specifically discuss, with reference to FIG. 7, a process for separating a plurality of text elements into a plurality of groups in the step S302. FIG. 7 is a flowchart showing a specific flow of the process (step S302) for separating the plurality of text elements into the plurality of groups. The step S302 includes steps S401 and S402 as illustrated in FIG. 7.

(Step S401)

In the step S401, the generation section 22 extracts a plurality of text elements from the logical formula representing the inference result. For example, the generation section 22 may extract a plurality of text elements from a logical formula representing an observation event. Specifically, in the case of the specific example of the logical formula illustrated in FIG. 4, text elements "claustrum", "bleeding", and "language disorder" are extracted from the logical formulas indicated by the nodes N1 to N3 that indicate the observation events.

(Step S402)

In the step S402, the generation section 22 separates the plurality of text elements into the plurality of groups on the basis of an attribute of an observation event, the attribute being related to each of the plurality of text elements. For example, each of the groups contains one or more text elements that are identical in attribute of the observation event. Note here that the attribute of an observation event is, as described earlier, an observer, an observation place, a timing of an observation, or a document describing the observation event, but is not limited to this. In the specific example of FIG. 6, attributes of the observation events are represented by the events "e1" to "e4". For example, the attribute of the observation event, the attribute being related to the text element "claustrum" extracted in the step S401, is the event "e1". This is because the event "e1" is contained in the logical formula indicated by the node N1 from which the text element "claustrum" is extracted. Similarly, the attributes of the observation event, the attributes being related to the text element "bleeding", are the events "e1" and "e3". The attribute of the observation event, the attribute being related to the text element "language disorder", is the event "e2". The generation section 22 separates these text elements into a group related to the event "e1" and a group related to the event "e2". In this specific example, since the event "e1" is equal to the event "e3", the generation section 22 does not generate a group related to the event "e3". The group related to the event "e1" contains the text elements "claustrum" and "bleeding". The group related to the event "e2" contains the text element "language disorder".

(Details of a Process for Generating Candidate Natural Language Sentences)

The following description will specifically discuss, with reference to FIG. 8, a process for generating candidate natural language sentences in the step S303. FIG. 8 is a flowchart showing a specific flow of the process (step S303) for generating candidate natural language sentences. The process illustrated in FIG. 8 is carried out with respect to each of the plurality of groups generated in the step S302. The step S303 includes steps S501 to S506 as illustrated in FIG. 8.

(Step S501)

In the step S501, the generation section 22 generates sequences obtained by arranging, in n orders, text elements contained in a target group (n is an integer of not less than 1).

For example, in a case where the target group contains one text element, the one text element is arranged in one order. In the example of FIG. 6, the group related to the event "e2" contains one text element "language disorder". In this case, a sequence {"language disorder"} obtained by arranging the one text element in one order is generated.

For example, in a case where the target group contains a plurality of text elements, there are a plurality of orders in which the text elements are arranged. For example, in the example of FIG. 6, the group related to the event "e1" contains two text elements "claustrum" and "bleeding". In this case, a first sequence {"claustrum", "bleeding"} and a second sequence {"bleeding", "claustrum"} that are obtained by arranging these text elements in two orders are generated.

Hereinafter, the information processing apparatus 2 carries out the steps S502 to S505 with respect to each of the sequences generated in the step S501 and obtained by arranging the text elements in the n orders. In the following description, a processing target sequence of text elements in an order is referred to as an ith sequence (i is an integer of not less than 1 and not more than n).

(Step S502)

In the step S502, the generation section 22 inputs the ith sequence to the language model L. For example, the generation section 22 inputs, to the language model L, the first sequence {"claustrum", "bleeding"} out of the two possible ordered sequences of the two text elements contained in the group related to the event "e1".

(Step S503)

In the step S503, the generation section 22 generates, with reference to an output from the language model L, a candidate word with which the ith sequence is complemented. Note that the generation section 22 may generate a blank candidate indicating connecting the ith sequence without complementing the ith sequence with any word. For example, the generation section 22 generates the blank candidate as a candidate word 1 for the first sequence {"claustrum", "bleeding"}. The generation section 22 generates, as a candidate word 2, a word "from" with which a space between these two text elements is complemented. The generation section 22 generates, as a candidate word 3, a word "no" with which a space followed by these two text elements is complemented. The generation section 22 generates other candidate word 4, 5, . . . .

(Step S504)

In the step S504, the generation section 22 evaluates a probability of the generated candidate words. Evaluating the probability is, for example, selecting, among candidate words output from the language model L, a candidate word whose probability satisfies an evaluation condition. The evaluation condition may be, for example, a condition that the probability is not less than a threshold. For example, the generation section 22 selects, among the above-described candidate words 1, 2, 3, 4, 5 . . . , the candidate words 1, 2, and 3 whose probability is not less than the threshold.

(Step S505)

In the step S505, the generation section 22 generates a candidate natural language sentence with use of a candidate word selected by evaluation. For example, the generation section 22 generates a candidate natural language sentence 1 "claustrum bleeding" by complementing the space between the two text elements in the ith sequence {"claustrum", "bleeding"} with the blank candidate serving as the candidate word 1. Furthermore, the generation section 22 generates a candidate natural language sentence 2 "bleeding from claustrum" by complementing the space between these two text elements with the candidate word 2 "from". Moreover, the generation section 22 generates a candidate natural language sentence 3 "no bleeding from claustrum" by complementing the space between these two text elements with the candidate word 2 "from" and complementing the space followed by these two text elements with the candidate word 3 "no".

Upon completion of the above process carried out with respect to n sequences in the steps S502 to S505, the process (step S303) for generating the natural language sentence for the target group is ended. In the candidate natural language sentence thus generated, text elements contained in the group occur in an ith order. Note here that in a case where the group contains a plurality of text elements, any two of the n orders correspond to an example of "first order" and "second order" which are recited in the claims. Thus, in other words, in a case where the plurality of text elements are contained in the group, the generation section 22 generates a first candidate natural language sentence in which the plurality of text elements occur in a first order and a second candidate natural language sentence in which the plurality of text elements occur in a second order that is different from the first order, and generates one or both of the first candidate natural language sentence and the second candidate natural language sentence as the natural language sentence. One or both of the first candidate natural language sentence and the second candidate natural language sentence is/are employed as the natural language sentence in a case where one or both of the first candidate natural language sentence and the second candidate natural language sentence is/are not excluded by the later-described process in the step S304 or S305. Note that in a case where a group contains one text element, one candidate natural language sentence may have been generated from the one text element contained in the group. Thus, the generation section 22 generates at least one candidate natural language sentence for each of the groups. The generation section 22 adds, to a set of output sentences, the at least one candidate natural language sentence generated for each of the groups. Note, however, that some or all of candidate natural language sentences added to the set of output sentences may be excluded from the set of output sentences through the later-described process in the step S304 or S305.

(Details of Process for Excluding Candidate Natural Language Sentence Similar to Original)

The following description will specifically discuss, with reference to FIG. 9, a process for excluding, in the step S304, one of the candidate natural language sentences which one is similar to the original D1. FIG. 9 is a flowchart showing a specific flow of the process (step S304) for excluding a candidate natural language sentence that is similar to the original D1. This example describes an example in which a condition that the original D1 contains a sentence which matches a candidate natural language sentence is used as a condition for determining whether the candidate natural language sentence is similar to the original D1.

The process illustrated in FIG. 9 is carried out with respect to each of the candidate natural language sentences included in the set of output sentences. The step S304 includes steps S601 and S602 as illustrated in FIG. 9.

(Step S601)

In the step S601, the first determination section 24 determines whether the original D1 contains a sentence that matches a target candidate natural language sentence. For example, a determination target part of the original D1 is a part indicated by ground information associated with the rule used for inference to obtain the inference result. In the example of FIG. 6, the ground information "document d11: p10, L1", "document d11: P10, L2", and "document d12: P30, L5" are associated with the rules r1 to r3 used for inference to obtain the inference result. Thus, the first determination section 24 determines, for each of the candidate natural language sentences 1 to 3, whether a corresponding part of the original D1 contains a sentence that matches a corresponding one of the candidate natural language sentences 1 to 3.

Assume, for example, that the corresponding part of the original D1 contains a content "claustrum bleeding . . . (omitted) . . . developing language disorder". In this case, the first determination 24 section determines that the corresponding part of the original D1 contains (i.e., is similar to) the candidate natural language sentence 1 "claustrum bleeding". The first determination section 24 also determines that the corresponding part of the original D1 does not contain (i.e., is dissimilar to) the candidate natural language sentence 2 "bleeding from claustrum". The first determination section 24 also determines that the corresponding part of the original D1 does not contain (i.e., is dissimilar to) the candidate natural language sentence 3 "no bleeding from claustrum".

(Step S602)

The first determination section 24 that has determined in the step S601 that the original D1 contains a sentence which matches the target candidate natural language sentence (Yes) excludes the target candidate natural language sentence from the set of output sentences. In a case where the first determination section 24 has determined in the step S601 that the original D1 does not contain a sentence which matches the target candidate natural language sentence (No), the step S602 is not carried out. For example, in the example described above, the candidate natural language sentence 1 is excluded from the set of output sentences, and the candidate natural language sentences 2 and 3 remain.

(Details of Process for Excluding Candidate Natural Language Sentence Inconsistent in Content with Original)

Figure 10:
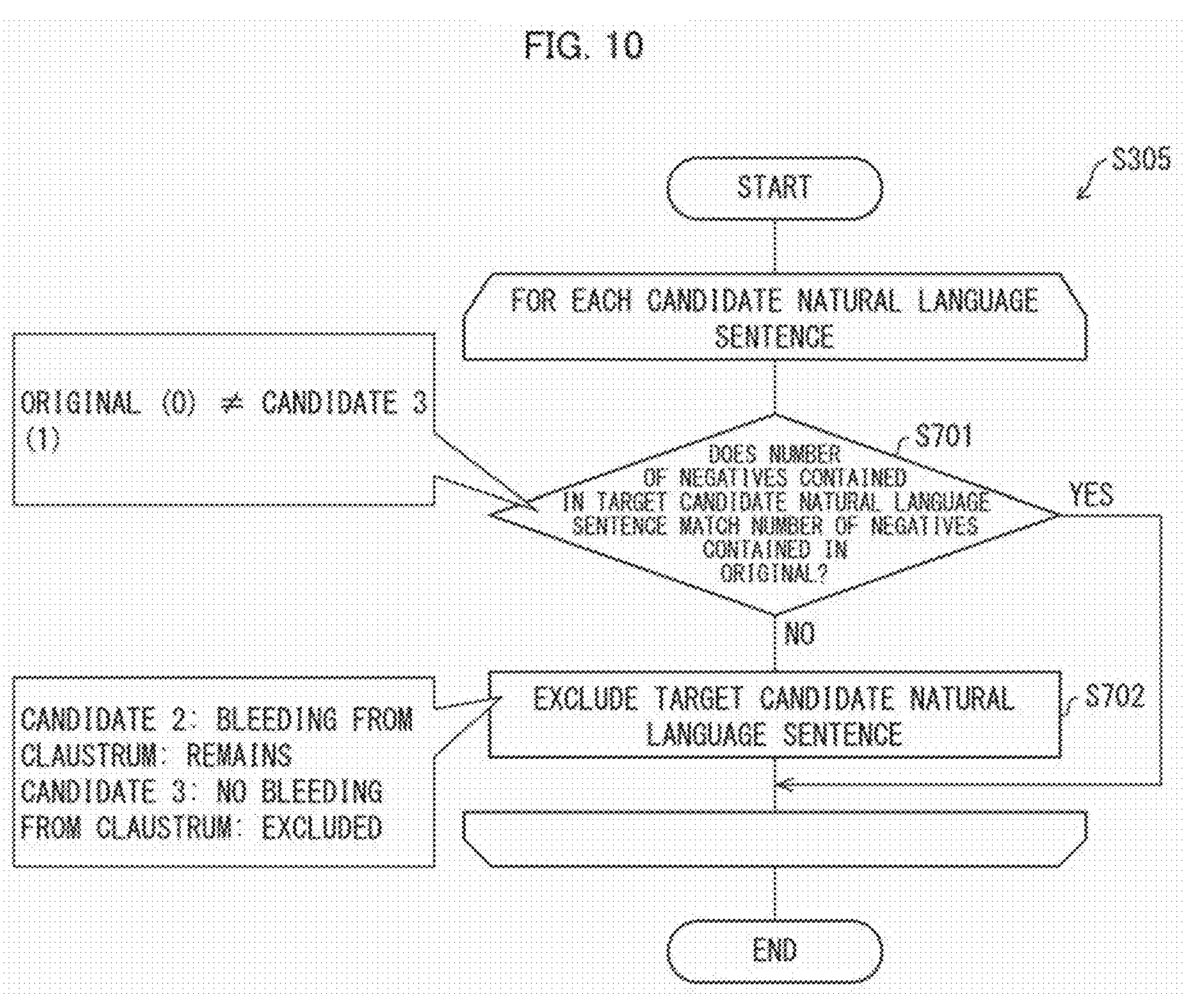
FIG. 10 is a flowchart showing a specific flow of a process in the second example embodiment of the present invention for excluding a candidate natural language sentence that is inconsistent in content with the original.

The following description will specifically discuss, with reference to FIG. 10, a process for excluding, in the step S305, one of the candidate natural language sentences which one is inconsistent in content with the original D1. FIG. 10 is a flowchart showing a specific flow of the process (step S305) for excluding a candidate natural language sentence that is inconsistent in content with the original D1. The following description discusses an example in which a condition that a result of comparison between the numbers of negatives is referred to is used as a condition for determining whether the candidate natural language sentence is consistent in content with the original D1. The process illustrated in FIG. 10 is carried out with respect to each of the candidate natural language sentences included in the set of output sentences. The step S305 includes steps S701 and S702 as illustrated in FIG. 9.

(Step S701)

In the step S701, the second determination section 25 determines, with reference to the result of comparison between the number of negatives contained in the target candidate natural language sentence and the number of negatives contained in the original D1, whether the target candidate natural language sentence is consistent with the contents of the original D1. More specifically, for example, the second determination section 25 determines whether the numbers of these negatives match. For example, as in the case of a part of the original D1 for which part it is to be determined whether the part is similar to the target candidate natural language sentence, a part of the original D1 for which part the number of negatives is to be compared with the number of negatives contained in the target candidate natural language sentence is a part indicated by ground information associated with the rule used for inference to obtain the inference result. The corresponding part in the example of FIG. 6 is as described earlier.

For example, the number of negatives contained in the original D1 "claustrum bleeding . . . (omitted) . . . developing language disorder" is 0 (zero). The number of negatives contained in the candidate natural language sentence 2 "bleeding from claustrum" is also 0 (zero). The number of negatives contained in the candidate natural language sentence 3 "no bleeding from claustrum" is one. Thus, the second determination section 25 determines, for the candidate natural language sentence 2, that the numbers of negatives match, that is, determines that the candidate natural language sentence 2 is consistent with the content of a corresponding part of the original D1. The second determination section 25 also determines, for the candidate natural language sentence 3, that the numbers of negatives do not match, that is, determines that the candidate natural language sentence 3 is inconsistent with the content of the corresponding part of the original D1.

(Step S702)

The second determination section 25 that has determined in the step S702 that the numbers of negatives do not match (No) excludes the target candidate natural language sentence from the set of output sentences. In a case where the second determination section 25 has determined in the step S701 that the numbers of negatives match (Yes), the step S702 is not carried out. For example, in the example described above, the candidate natural language sentence 3 is further excluded from the candidate natural language sentences 2 and 3 remaining in the set of output sentences, and the candidate natural language sentence 2 remains.

As described above, in a case where the steps S303 to S305 are carried out for each of the groups, a candidate natural language sentence remaining in the set of output sentences is employed and output in the step S306.

Specific Example

For example, in the example of FIG. 6, as described earlier, the candidate natural language sentence 3 "no bleeding from claustrum" remains in the set of output sentences for the first sequence {"bleeding", "claustrum"} in the group related to the event "e1".

Note that it is assumed in this example that for the second sequence {"bleeding", "claustrum"} in the group related to the event "e1", a candidate natural language sentence has been generated in the step S303 and added to the set of output sentences but excluded from the set of output sentences in the steps S304 and S305.

For the group related to the event "e2", only one text element {"language disorder"} contained in the group is used as a sequence to carry out the step S303. With this, a candidate natural language sentence 4 "with language disorder", a candidate natural language sentence 5 "developing language disorder", and a candidate natural language sentence 6 "without language disorder" are generated and added to the set of output sentences. In a case where the step S304 is carried out, among the candidate natural language sentences 4 to 6, the candidate natural language sentence 5 "developing language disorder" that is contained in the corresponding part of the original D1 is excluded. Furthermore, in a case where the step S305 is carried out, out of the remaining candidate natural language sentences 4 and 6, the candidate natural language sentence 6 "without language disorder" whose number of negatives does not match the number of negatives in the corresponding part of the original D1 is excluded. With this, the candidate natural language sentence 4 remains in the set of output sections.

Thus, in the step S306, the candidate natural language sentences 2 and 4 remaining in the set of output sentences are employed, and natural language sentences "no bleeding from claustrum" and "with language disorder" are output.

Effect of the Present Example Embodiment

As described above, in the present example embodiment, a configuration is employed such that among the candidate natural language sentences generated with use of the language model L, a candidate natural language sentence which is not contained in the corresponding part of the original D1 and whose number of negatives matches the number of negatives in the corresponding part of the original D1 is employed and output.

Note here that a natural language sentence generated with use of the language model L can contain an expression contained in the corpus D2 but accidentally match a sentence contained in the original D1. By employing the above configuration, the present example embodiment makes it possible to generate a natural language sentence that is more reliably diverse as compared with a corresponding part of the original D1.

Note also that the natural language sentence generated with use of the language model L can contain an expression which is not contained in the original D1 and which is contained in the corpus D2. This can cause a case where the natural language sentence is inconsistent with the contents of the original D1. By employing the above configuration, the present example embodiment makes it possible to generate a natural language sentence that is not only more reliably diverse as compared with a corresponding part of the original D1 but also more accurately indicates the contents of the original D1.

Furthermore, in the present example embodiment, a configuration is employed such that the language model L that has been generated on the basis of the corpus D2 which does not contain the original D1 used to generate the inference rule R and whose field is identical to the field of the original D1 is used in order to generate a natural language sentence from a logical formula representing an inference result.

With this, according to the present example embodiment, a natural language sentence that contains an expression which is unique to a field identical to the field of the original D1 is generated while a natural language sentence that is more diverse as compared with a sentence included in the original D1 is generated. This makes it possible to generate a natural language sentence that more accurately represents details of the inference result.

Moreover, in the present example embodiment, a configuration is employed such that a plurality of text elements contained in a logical formula are separated into a plurality of groups by causing text elements which are identical in attribute of an observation event to be contained in one group, and a candidate natural language sentence is generated for each of the plurality of groups.

This enables a natural language sentence generated in the present example embodiment to more accurately represent the details of the inference result without containing a plurality of text elements that are less related to each other, such as those different in attribute of an observation event.

<Variation>

The present example embodiment has discussed an example in which a condition that a corresponding part of the original D1 contains a candidate natural language sentence is used as a condition for determining whether the candidate natural language sentence is similar to the corresponding part. In other words, in this case, the candidate natural language sentence is excluded in a case where the corresponding part of the original D1 contains a sentence that matches the candidate natural language sentence, and is employed otherwise. The condition for determining whether the candidate natural language sentence is similar to the corresponding part of the original D1 is not limited to this and can be changed to a condition that the corresponding part contains a sentence whose degree of similarity to the candidate natural language sentence is not less than a threshold. In this case, the candidate natural language sentence is excluded in a case where the corresponding part of the original D1 contains a sentence that is similar to the candidate natural language sentence, and is employed otherwise. Also in a case where the condition for determining whether the candidate natural language sentence is similar to the corresponding part of the original D1 is thus changed, the present example embodiment makes it possible to output a natural language sentence that is more diverse as compared with the original D1.

The present example embodiment has also discussed an example in which a condition that the number of negatives contained in a candidate natural language sentence matches the number of negatives contained in a corresponding part of the original D1 is used as a condition for determining whether the candidate natural language sentence is consistent with the contents of the original D1. The condition for determining whether the candidate natural language sentence is consistent with the contents of the original D1 is not limited to this and can be, for example, changed to another condition that a result of comparison between the numbers of negatives is referred to. For example, the another condition that the result of comparison between the numbers of negatives is referred to may be a condition that a difference in number of negatives is a multiple of 2. The condition for determining whether the candidate natural language sentence is consistent with the contents of the original D1 is not limited to the condition that the result of comparison between the numbers of negatives is referred to, and may be still another condition. Also in a case where the condition for determining whether the candidate natural language sentence is consistent with the contents of the original D1 is thus changed, the present example embodiment makes it possible to output a natural language sentence that more accurately represents the contents of the original D1.

The present example embodiment has also discussed an example in which in a case where a logical formula representing an inference result contains a plurality of text elements, a plurality of groups are generated by forming, into one group, text elements that are identical in related attribute of an observation event. The generation section 22 may generate a plurality of groups not only by the above but also by forming, into one group, text elements whose related attributes of an observation event satisfy a predetermined condition. Alternatively, the generation section 22 may generate a plurality of groups on the basis of not only an attribute of an observation event but also another attribute related to each of the text elements.

Software Implementation Example

Some or all of functions of the information processing apparatuses 1 and 2 can be realized by hardware such as an integrated circuit (IC chip) or the like or can be alternatively realized by software.

Figure 11:
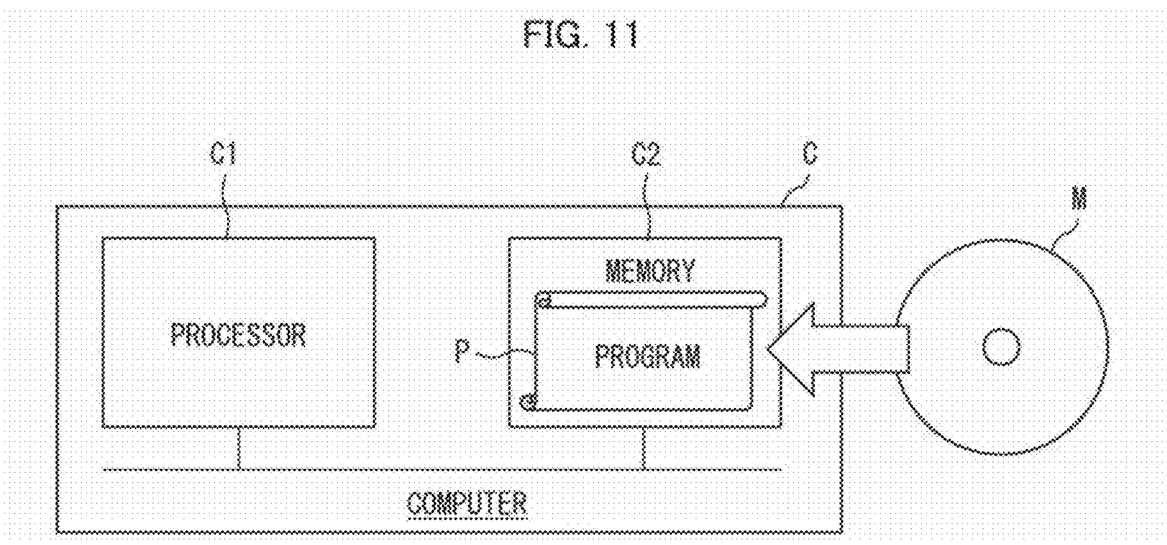
FIG. 11 is a block diagram illustrating a configuration of a computer functioning as each of information processing apparatuses according to the respective example embodiments of the present invention.

In the latter case, each of the information processing apparatuses 1 and 2 is realized by, for example, a computer that executes instructions of a program that is software realizing the foregoing functions. FIG. 11 illustrates an example of such a computer (hereinafter referred to as "computer C"). The computer C includes at least one processor C1 and at least one memory C2. The memory C2 stores a program P for causing the computer C to operate as the information processing apparatuses 1 and 2. In the computer C, the processor C1 reads and executes the program P stored in the memory C2, so that the functions of the information processing apparatuses 1 and 2 are realized.

The processor C1 may be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination thereof. The memory C2 may be, for example, a flash memory, a hard disk drive (HDD), a solid state drive (SSD), or a combination thereof.

Note that the computer C may further include a random access memory (RAM) in which the program P is loaded when executed and/or in which various kinds of data are temporarily stored. The computer C may further include a communication interface for transmitting and receiving data to and from another apparatus. The computer C may further include an input/output interface for connecting the computer C to an input/output apparatus(es) such as a keyboard, a mouse, a display, and/or a printer.

The program P can also be recorded in a non-transitory tangible storage medium M from which the computer C can read the program P. Such a storage medium M may be, for example, a tape, a disk, a card, a semiconductor memory, a programmable logic circuit, or the like. The computer C can acquire the program P via the storage medium M. The program P can also be transmitted via a transmission medium. The transmission medium may be, for example, a communication network, a broadcast wave, or the like. The computer C can acquire the program P also via the transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can also be described as below. Note, however, that the present invention is not limited to the following supplementary notes.

(Supplementary Note 1)

An information processing apparatus including:

an acquisition means that acquires a logical formula representing an inference result which is based on an inference rule for an observation event;

a generation means that generates a natural language sentence from at least one text element with use of a language model generated on the basis of a corpus which does not contain a document used to generate the inference rule, the at least one text element being included in constituents of the logical formula and being text; and an output means that outputs the natural language sentence.

With the above configuration, a generated natural language sentence is expected to contain an expression that is used in a corpus which does not contain a document used to generate an inference rule. Thus, a natural language sentence that is more diverse as compared with a document used to generate an inference rule is generated from a logical formula representing an inference result.

(Supplementary Note 2)

The information processing apparatus according to Supplementary note 1, wherein the generation means uses, as the language model, a language model generated with use of the corpus which does not contain the document and whose field is identical to a field of the document.

With the above configuration, a generated natural language sentence is expected to contain an expression that is unique to a target field. This makes it possible to generate a natural language sentence that accurately represents details of an inference result while being more diverse as compared with a document used to generate an inference rule.

(Supplementary Note 3)

The information processing apparatus according to Supplementary note 1 or 2, further including a first determination means that determines, with reference to a result of comparison between the natural language sentence and the document, whether the natural language sentence is similar to the document, the output means outputting the natural language sentence in a case where it is determined by the first determination means that the natural language sentence is dissimilar to the document.

With the above configuration, a natural language sentence that is dissimilar to a document used to generate an inference rule is employed. This makes it possible to generate a natural language sentence that is more reliably diverse as compared with the document.

(Supplementary Note 4)

The information processing apparatus according to any one of Supplementary notes 1 to 3, further including a second determination means that determines, with reference to a result of comparison between the natural language sentence and the document, whether the natural language sentence is consistent with contents of the document, the output means outputting the natural language sentence in a case where it is determined by the second determination means that the natural language sentence is consistent with the contents of the document.

With the above configuration, a natural language sentence that is consistent with contents of a document used to generate an inference rule is employed. This makes it possible to generate a natural language sentence that more accurately represents details of an inference result while being more diverse as compared with a document used to generate an inference rule.

(Supplementary Note 5)

The information processing apparatus according to Supplementary note 4, wherein the second determination means refers to a result of comparison between the number of negatives contained in the natural language sentence and the number of negatives contained in the document.

With the above configuration, a natural language sentence that represents a meaning which is opposite to contents of a document used to generate an inference rule is not employed. This makes it possible to generate a natural language sentence that more accurately represents details of an inference result while being more diverse as compared with a document used to generate an inference rule.

(Supplementary Note 6)

The information processing apparatus according to any one of Supplementary notes 1 to 5, wherein in a case where the at least one text element that is contained in the logical formula comprises a plurality of text elements, the generation means separates the plurality of text elements into a plurality of groups and generates the natural language sentence for each of the plurality of groups.

With the above configuration, a generated natural language sentence does not contain a plurality of text elements that are less related to each other, such as those classified into different groups. This makes it possible to generate a natural language sentence that more accurately represents details of an inference result while being more diverse as compared with a document used to generate an inference rule.

(Supplementary Note 7)

The information processing apparatus according to Supplementary note 6, wherein the generation means separates the plurality of text elements into the plurality of groups on the basis of an attribute of the observation event, the attribute being related to each of the plurality of text elements.

With the above configuration, a generated natural language sentence does not contain a plurality of text elements whose attributes of an observation event are less related to each other. This makes it possible to generate a natural language sentence that more accurately represents details of an inference result while being more diverse as compared with a document used to generate an inference rule.

(Supplementary Note 8)

The information processing apparatus according to any one of Supplementary notes 1 to 7, wherein in a case where the at least one text element that is contained in the logical formula comprises a plurality of text elements, the generation means generates a first candidate natural language sentence in which the plurality of text elements occur in a first order and a second candidate natural language sentence in which the plurality of text elements occur in a second order that is different from the first order, and generates one or both of the first candidate natural language sentence and the second candidate natural language sentence as the natural language sentence.

With the above configuration, an order in which a plurality of text elements occur is considered. This makes it possible to generate a natural language sentence that more accurately represents details of an inference result while being more diverse as compared with a document used to generate an inference rule.

(Supplementary Note 9)

An information processing method including:

acquiring a logical formula representing an inference result which is based on an inference rule for an observation event;

generating a natural language sentence from at least one text element with use of a language model generated on the basis of a corpus which does not contain a document used to generate the inference rule, the at least one text element being included in constituents of the logical formula and being text; and outputting the natural language sentence.

The above configuration brings about an effect similar to that of Supplementary note 1.

(Supplementary Note 10)

A program for causing a computer to function as an information processing apparatus, the program causing the computer to function as:

an acquisition means that acquires a logical formula representing an inference result which is based on an inference rule for an observation event;

a generation means that generates a natural language sentence from at least one text element with use of a language model generated on the basis of a corpus which does not contain a document used to generate the inference rule, the at least one text element being included in constituents of the logical formula and being text; and an output means that outputs the natural language sentence.

The above configuration brings about an effect similar to that of Supplementary note 1.

[Additional Remark 3]

The whole or part of the example embodiments disclosed above can also be expressed as follows.

An information processing apparatus comprising at least one processor, the at least one processor carrying out:

an acquisition process for acquiring a logical formula representing an inference result which is based on an inference rule for an observation event;

a generation process for generating a natural language sentence from at least one text element with use of a language model generated on the basis of a corpus which does not contain a document used to generate the inference rule, the at least one text element being included in constituents of the logical formula and being text; and an output process for outputting the natural language sentence.

Note that the information processing apparatus may further include a memory, which may store a program for causing the at least one processor to carry out the acquisition process, the generation process, and the output process. The program may be stored in a non-transitory tangible computer-readable storage medium.

REFERENCE SIGNS LIST

1, 2 Information processing apparatus
12, 22 Generation section
11, 21 Acquisition section
13, 23 Output section
24 First determination section
25 Second determination section
26 Language model generation section
C Computer
C1 Processor
C2 Memory

What is claimed is:

1. An information processing apparatus comprising:

a memory storing instructions; and one or more processors configured to execute the instructions to:

acquire a logical formula representing an inference result which is based on an inference rule for an observation event;

generate one or more candidate natural language sentences from at least one text element with use of a language model generated on the basis of a corpus which does not contain a document used to generate the inference rule, the at least one text element being included in constituents of the logical formula and being text, wherein the one or more candidate natural language sentences is generated by the language model by calculating a continuous occurrence probability with which words contained in an extracted n-gram occur continuously, and the language model is generated based on a statistical result for a continuous occurrence probability;

store the language model in a memory;

identify, as a comparison target portion of the document used to generate the inference rule, a portion indicated by ground information associated with a rule applied to obtain the inference result;

determine, with reference to a result of comparison between each candidate natural language sentence and the comparison target portion, whether the candidate natural language sentence is similar to the document;

exclude a candidate natural language sentence determined to be similar;

determine, with reference to a result of comparison between a number of negatives contained in each remaining candidate natural language sentence and a number of negatives contained in the comparison target portion, whether the remaining candidate natural language sentence is consistent with contents of the document;

exclude a remaining candidate natural language sentence determined to be inconsistent; and output, as the natural language sentence, a candidate natural language sentence remaining after the excluding.

2. The information processing apparatus according to claim 1, wherein in the generation process, the at least one processor uses, as the language model, a language model generated with use of the corpus which does not contain the document and whose field is identical to a field of the document.

3. The information processing apparatus according to claim 1, wherein the one or more processors are configured to determine whether the candidate natural language sentence is similar based on whether the comparison target portion contains a sentence whose degree of similarity to the candidate natural language sentence is not less than a threshold.

4. The information processing apparatus according to claim 1, wherein the one or more processors are configured to output the natural language sentence in a case where the candidate natural language sentence is not excluded as being similar and is not excluded as being inconsistent.

5. The information processing apparatus according to claim 4, wherein the one or more processors are configured to determine consistency based on whether a difference between the number of negatives contained in the candidate natural language sentence and the number of negatives contained in the comparison target portion is a multiple of 2.

6. The information processing apparatus according to claim 1, wherein in a case where the at least one text element that is contained in the logical formula comprises a plurality of text elements, in the generation process, the at least one processor separates the plurality of text elements into a plurality of groups and generates the natural language sentence for each of the plurality of groups.

7. The information processing apparatus according to claim 6, wherein in the generation process, the at least one processor separates the plurality of text elements into the plurality of groups on the basis of an attribute of the observation event, the attribute being related to each of the plurality of text elements.

8. The information processing apparatus according to claim 1, wherein in a case where the at least one text element that is contained in the logical formula comprises a plurality of text elements, in the generation process, the at least one processor generates a first candidate natural language sentence in which the plurality of text elements occur in a first order and a second candidate natural language sentence in which the plurality of text elements occur in a second order that is different from the first order, and generates one or both of the first candidate natural language sentence and the second candidate natural language sentence as the natural language sentence.

9. An information processing method comprising:

acquiring a logical formula representing an inference result which is based on an inference rule for an observation event;

generating one or more candidate natural language sentences from at least one text element with use of a language model generated on the basis of a corpus which does not contain a document used to generate the inference rule, the at least one text element being included in constituents of the logical formula and being text, wherein the one or more candidate natural language sentences is generated by the language model by calculating a continuous occurrence probability with which words contained in an extracted n-gram occur continuously, and the language model is generated based on a statistical result for a continuous occurrence probability;

storing the language model in a memory;

identifying, as a comparison target portion of the document used to generate the inference rule, a portion indicated by ground information associated with a rule applied to obtain the inference result;

determining, with reference to a result of comparison between each candidate natural language sentence and the comparison target portion, whether the candidate natural language sentence is similar to the document;

excluding a candidate natural language sentence determined to be similar;

determining, with reference to a result of comparison between a number of negatives contained in each remaining candidate natural language sentence and a number of negatives contained in the comparison target portion, whether the remaining candidate natural language sentence is consistent with contents of the document;

excluding a remaining candidate natural language sentence determined to be inconsistent; and outputting, as the natural language sentence, a candidate natural language sentence remaining after the excluding.

10. A non-transitory storage medium storing therein a program for causing a computer to function as an information processing apparatus, the program causing the computer to:

acquire a logical formula representing an inference result which is based on an inference rule for an observation event;

generate one or more candidate natural language sentences from at least one text element with use of a language model generated on the basis of a corpus which does not contain a document used to generate the inference rule, the at least one text element being included in constituents of the logical formula and being text, wherein the one or more candidate natural language sentences is generated by the language model by calculating a continuous occurrence probability with which words contained in an extracted n-gram occur continuously, and the language model is generated based on a statistical result for a continuous occurrence probability;

store the language model in a memory;

identify, as a comparison target portion of the document used to generate the inference rule, a portion indicated by ground information associated with a rule applied to obtain the inference result;

determine, with reference to a result of comparison between each candidate natural language sentence and the comparison target portion, whether the candidate natural language sentence is similar to the document;

exclude a candidate natural language sentence determined to be similar;

determine, with reference to a result of comparison between a number of negatives contained in each remaining candidate natural language sentence and a number of negatives contained in the comparison target portion, whether the remaining candidate natural language sentence is consistent with contents of the document;

exclude a remaining candidate natural language sentence determined to be inconsistent; and output, as the natural language sentence, a candidate natural language sentence remaining after the excluding.

* * * * *